Dec. 9, 1958  E. G. MACALA  2,863,479
CUTTER AND MANIPULATOR FOR MAKING LAYER CAKES
Filed May 11, 1956
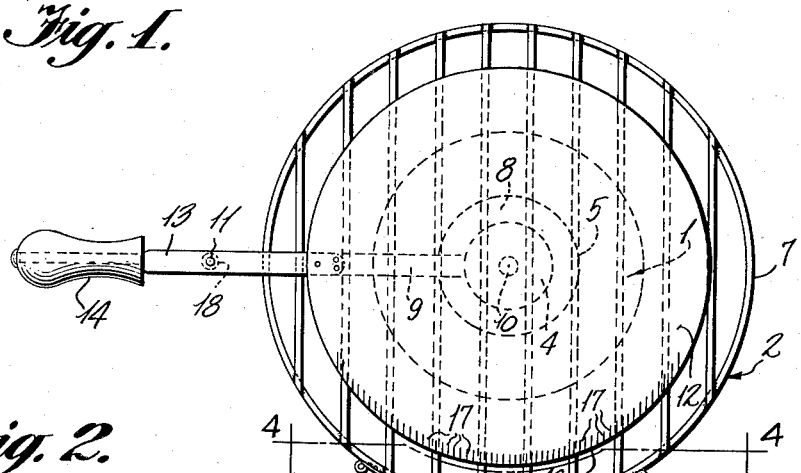
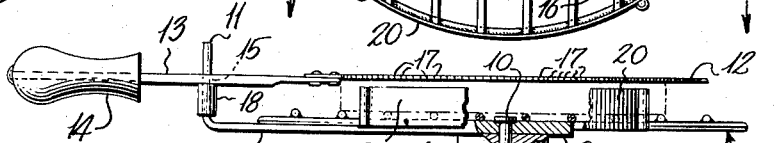
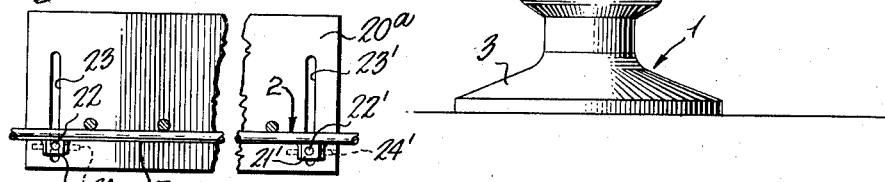
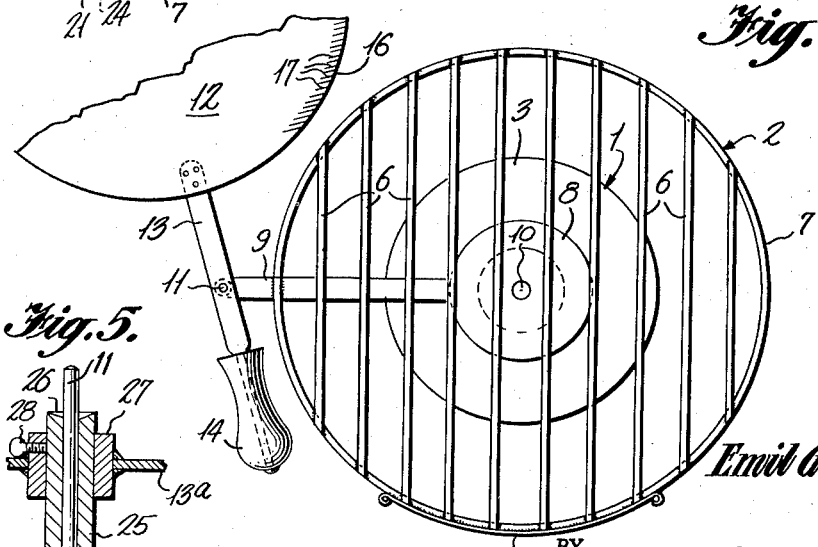
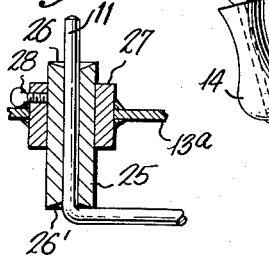
INVENTOR
*Emil G. Macala*
BY
*Mason, Fenwick & Lawrence*
ATTORNEYS United States Patent Office 2,863,479
Patented Dec. 9, 1958

2,863,479

CUTTER AND MANIPULATOR FOR MAKING LAYER CAKES

Emil G. Macala, Cleveland, Ohio

Application May 11, 1956, Serial No. 584,262

7 Claims. (Cl. 146—72)

This invention relates to food handling equipment and more particularly to equipment for manipulating baked layers of cake, used in assembling layer cakes.

A layer of cake, being a fragile item of food, requires great care in the handling of it, as no appreciable area of the cake layer can be left unsupported, since it will break away under the influence of its own weight.

As it is well known, a layer cake may be prepared by baking each layer separately and using a plurality of layers to form the cake, icing or filling being interspersed between each layer; or the cake may be formed of layers obtained by slicing in two a layer baked double thick.

A layer for a cake having been baked in a pan in an oven is removed from the oven and placed upside down on a plate. The layer shrinks in cooling and the steam from the layer condenses on the pan, so that the pan can readily be removed from the layer in a short time. When the pan is removed, the upside down cake layer must be turned over to be used in assembling the cake. This is frequently done by placing another plate over the cake layer, and inverting the plates with the cake layer between them. If the operation is too slow, the cake may fall from between the plates when they are revolved about 90°, and if the operation is too fast, the cake layer may be thrown or partially thrown from between the plates. In handling the second layer of cake, the hand is usually used instead of a second or top plate because more control can be obtained in laying the top layer on the iced bottom layer. While more control can be obtained by using the hand as a platform, there will be appreciably large areas of the cake layer left unsupported and this often results in damage to the layer.

Also, when one thick layer of cake is used to make two layers by slicing the layer transversely, the usual practice is to use a knife for the slicing operation. The resulting two layers must then be separated and the top layer moved away, so that the icing may be applied to the bottom layer, after which the top layer is replaced. This operation is even more precarious than the inverting operation and the frequent result is an imperfect cake due to breaking or tearing of the top layer.

Consequently, it is an object of the present invention to provide a manipulator for handling the layers of a layer cake during the assembling of the cake, whereby the layers will at all times be adequately supported throughout their area during turning and positioning operations.

Another object of the present invention is to provide means for slicing a double thickness layer of cake to form a two-layer cake therefrom, whereby the slicing means is a platform which supports the uppermost portion of the cake being sliced during and after the slicing operation.

A further object of the present invention is to provide an economical, easy-to-operate manipulator, wherein the same parts act together in different ways to meet the requirements of the various operations encountered in the handling of the cake layers during the dissembling of a layer cake.

Other objects and advantages will become apparent from the following description of one embodiment of the invention and the accompanying drawings; wherein, Figure 1 is a plan view of a layer cake manipulator made in accordance with the present invention, showing the inverting plate in position over the platform;

Figure 2 is a side elevation of the cake manipulator shown in Figure 1, a portion being in section;

Figure 3 is a plan view of the cake manipulator showing the inverting plate pivoted away from the cake receiving platform;

Figure 4 is a partial vertical section through the platform taken on the line 4—4 of Figure 1, showing in elevation a modified form of cake stop; and Figure 5 is a detailed sectional view showing an adjustable mounting for the inverting plate.

Adverting now to the drawings, there is shown in Figures 1 to 3 a manipulator for assembling layer cakes comprising a pedestal 1 and a platform 2 for receiving a layer of cake. The pedestal 1 is provided with a wide base portion 3 to give the manipulator stability when it is resting on a table, a shaft 4 which serves as a handle for raising the manipulator from the table, and a finger stop 5. The finger stop 5 facilitates grasping and holding the manipulator pedestal when operations are being performed on a layer of cake which involve inverting the manipulator.

The platform 2 is shown in the present embodiment of the invention as being a grill formed of a plurality of parallel rods 6 welded to a ring 7 and to a center plate 8 which is attached to the pedestal 1. The grill structure of the platform 2 provides better visibility for the operator when using the manipulator for inverting a layer of cake and positioning it on a cake dish, an operation which will later be described in detail.

A pivot support arm 9 extends radially underneath the platform 2. Its inner end is welded to the peripheral edge of the center plate 8, and its outer end extends outward beyond the periphery of the platform 2, as shown in Figure 2. The arm 9 is welded to the ring 7 of the platform 2. The outermost portion of the pivot support arm 9 is of round cross-section. A bolt 10 fastens the platform 2 to the shaft 4.

A spindle 11 is formed on the pivot support arm 9 by upturning the outer end of the said arm 90° at a point outward of the platform 2, as shown in Figure 2.

An inverting plate 12 for mounting detachably on the spindle 11 is provided with a handle 13 and a hand grip 14. The inverting plate 12 is of a size and shape to support the area of a layer of cake received from the platform 2 when the manipulator is inverted. In the embodiment described herein, the inverting plate is circular and of slightly smaller diameter than the platform 2.

A bearing 15 is formed in the handle 13 and the spindle 11 is journaled detachably in this bearing to swingably mount the inverting plate 12 over the platform 2 concentric therewith.

The inverting plate 12 is formed as a disk of metal, such as aluminum, steel, or other suitable material used in making food handling equipment. A sharpened peripheral edge 16 extends around one-half of the perimeter of the inverting plate 12, said sharpened edge being on one side of a line drawn longitudinally of the handle 13 which bisects the said plate. Said sharpened edge is formed with serrations as at 17.

A guide 18 is a sleeve which serves as a spacer on the spindle 11 to space the inverting plate 12 away from the platform 2 and may be made in a plurality of heights according to the height of the various layers of cake to be manipulated.

A cake stop 20 is positioned at the outer periphery of the platform 2 and is welded or otherwise attached to the ring 7. The said stop extends an appreciable distance around one-half of the circumference of the platform 2 which lies on one side of the pivot support arm 9. The height of the cake stop 20 is approximately equal to the thickness of a cake layer. The cake stop may be made adjustable for height, as shown at 20a in Figure 4, by welding studs 21—21' on the under side of the ring 7, these studs being drilled and threaded to receive the bolts 22—22'. The threaded outer ends of the bolts 22—22' extend beyond the outer edge of the platform 2. The cake stop 20a is formed with vertical slots 23—23' for mounting on the bolts 22—22', respectively, and wing nuts 24—24' adjustably fasten the cake stop 20a at the proper height for the thickness of the cake layer being manipulated.

In Figure 5, there is shown means for adjustably spacing the inverting plate 12 away from the platform 2. A sleeve 25 is provided for detachably mounting on the spindle 11, said sleeve having concave ends 26—26' so that the spindle 11 may be more easily journaled therein. A handle 13a of the inverting plate 12 is provided with a bearing 27 for slidably mounting the inverting plate 12 on the sleeve 25, the bearing 27 being welded in the handle 13a. The bearing 27 is drilled and threaded to receive a thumb screw 28 which extends through the wall of said bearing to engage the sleeve 25 so that the bearing 27 may be positioned at any desired height on the sleeve 25 and consequently the inverting plate 12 may be spaced away from the platform 2 in accordance with the height of a layer of cake on the said platform.

In the operation of the manipulator of the present invention, the inverting plate 12 is first withdrawn from the spindle 11 and is used to reomve from the oven in which it was baked, a layer of cake baked in a pan. The inverting plate is held by the hand grip 14, and by sliding the said inverting plate underneath the baking pan until the pan is fully on the inverting plate, the baking pan with the freshly baked layer of cake in it may safely be removed from the oven. Holding the baking pan thus in one hand, the operator grasps the platform 2 by its shaft 4 with the other hand, using the finger stop 5 to obtain a firm grip as by positioning the finger stop between the second and third fingers. The platform 2 is then inverted and brought down concurrently on top of the cake layer in the baking pan, at the same time journaling the spindle 11 of the platform 2 in the bearing 15 in the handle of the inverting plate. Then, by inverting the manipulator, the layer of cake will be resting topside down on the platform 2, with the baking pan uppermost. This inversion may be most safely accomplished by turning the manipualtor in such direction that the cake stop 20 underlies the edge of the layer of cake. The inverting plate 12 may now be swung to one side and the cake allowed to steam a short time, after which, the baking pan is removed.

The layer of cake is now to be turned topside up and placed on a cake dish. The inverting plate 12 is swung back into position over the layer of cake, and holding the manipulator with the hand grip 14 in one hand and the shaft 4 in the other hand, the operator inverts the manipulator. It is then positioned over the cake dish in which the layer cake is to be assembled, the inverting plate 12 being in lowermost position and held very close to the cake dish. The said inverting plate is then swung about its pivot 15 in the direction of the cake stop 20 fixed to the platform 2. As the inverting plate is swung, it passes from beneath the cake layer, since the cake layer is being held by the cake stop 20, leaving the cake layer in position on the cake dish with its upper face exposed. Cake filling is then spread on this first layer.

The second layer of cake for making the layer cake is removed from the oven in its baking pan in the manner already described in connection with the first layer. It is then inverted and the baking pan is removed. The inverting plate is swung over the cake layer and the manipulator is inverted so that the cake layer will rest topside up on the inverting plate. As more care must be used to precisely place the second layer on the iced first layer, the inverting plate is first swung sufficiently to bring the cake layer up to the cake stop and then the manipulator is positioned over the iced first layer of cake on the cake dish. By bringing the layer of cake in the manipulator up to the cake stop before positioning the manipulator over the first layer on the disk, the alignment of the two layers may better be judged. The inverting plate is then swung on its pivot toward the cake stop until it passes from beneath the layer, leaving this second layer concurrently positioned on top of the iced first layer. The cake is then completed by applying icing over the top of the second layer and the sides of the two layers, if desired.

Where the manipulator of the present invention is used for assembling a layer cake made from a single layer of cake baked double thick and sliced into two layers, the cake layer is removed from the oven in its baking pan, inverted and the baking pan removed in the manner hereinbefore described. The sharp serrated edges 16 of the inverting plate 12 is used as a slicer for severing the cake layer into two layers. The modified form of guide 18 shown in Figure 5 and the adjustable cake stop shown in Figure 4 will be used in the description of the manipulator for slicing and assembling a layer cake from a single layer of cake baked double thick. The bearing 27 is set on the sleeve 25 to space the inverting plate 12 when it is mounted on the spindle 11 away from the platform 2 a distance equal approximately to one-half the height of the cake layer to be sliced, and the thumbscrew 28 is tightened.

The slicing of the double thick layer of cake is begun by placing the inverting plate on the spindle 11. One hand is placed on top of the cake layer to give it support from the top. The other hand is used to swing the sharp serrated edge 16 of the inverting plate into the peripheral edge of the cake on the side opposite the cake stop 20, the edge of the cake layer being placed adjacent the cake stop. Due to the fact that cake tends to yield to pressure, the inverting plate is backed up after each light cut has been completed. A series of rapid, compactive light cuts are made until the entire layer has been severed. This method of slicing cake layers is preferred for chiffon, devil's food, spice, brown, yellow and fudge cakes, as they may be cleanly and safely severed in this manner. Very light, spongy-textured cakes have a tendency to bear with the force of the back and forth thrusts of the inverting plate and the slicing of such cakes may better be accomplished by the following method: For the slicing of angel food cakes and the like, the inverting plate 12 may be removed from its pivot on the spindle 11 and used as a broad blade knife using a sawing motion, and when it is so used the relatively great width of the blade aids in guiding it in a planiform path through the cake layer. A sprinkling of flour, starch or the like, on the inverting plate, will facilitate slicing cakes which are sticky.

When the slicing operation by either method described is completed, the sliced off portion of the layer is supported on the inverting plate. This sliced off portion will be the bottom layer of the finished cake, and the inverting plate bearing this portion of the cake layer is swung aside on its pivot while the cake filling is spread on the layer remaining on the platform 2. This latter mentioned layer will be the top layer of the assembled cake. When the icing of the cake layer on the platform 2 is completed, the thumbscrew 28 is loosened and the bearing 27 is moved upward on the sleeve 25 a distance sufficient to insure that the inverting plate 12 will clear the icing when it is swung back over the cake layer on the platform 2. The thumbscrew 28 is then tightened and the inverting plate 12 is swung to position the layer carried thereon concurrently with the layer on the platform 2. The operator using one hand as a cake stop, swings the inverting plate by its handle with the other hand until the inverting plate is removed from beneath the layer, thereby positioning the second layer on top of the iced layer on the platform 2. The next operation is the inverting of the two layers of cake. This is done by first raising the cake stop 20a to a height slightly less than the height of the two layers of cake on the platform 2; next the inverting plate 12 is swung over the two layers, the thumbscrew 28 being loosened to allow the inverting plate to rest on the topmost layer; then the cake is inverted in the manner described hereinbefore for inverting a cake layer. The cake is positioned over a cake dish and the inverting plate is swung from beneath the cake in the direction of the cake stop 20a. The cake is completed by applying icing on the top and sides, if desired.

From the foregoing, it will be seen that there has been provided a manipulator for assembling layer cakes which will greatly facilitate the assembling operations by providing means for safely turning the layers of the cake and positioning them on a cake dish or on other layers of cake. While the invention has been described primarily with respect to a two-layer cake, it can readily be seen that the manipulator may be used to equal advantage for making cakes containing more than two layers. Also, there has been provided a manipulator for slicing and handling a single layer of cake to make a two-layer cake therefrom.

Therefore, although this invention has been described with reference to one illustrative embodiment thereof, it will be readily apparent to those skilled in the art that it may be embodied in other forms within the scope of the invention.

What is claimed is:

1. A manipulator for supporting, cutting, and turning cake, comprising, a support having an upstanding cake-stop flange along at least a portion of its periphery, said support having a pivot spindle spaced outwardly from said support and extending normally with respect thereto, and an inverting plate cutter supported on said pivot spindle, overlying and spaced from said support.

2. In a manipulator for supporting, cutting and turning cake, as claimed in claim 1, means operatively coupled with said cake stop flange for selectively varying the height of said cake stop flange.

3. In a manipulator for supporting, cutting and turning cake, as claimed in claim 1, means operatively coupled with said cake stop flange for selectively varying the height of said cake stop flange and guide means for spacing said inverting plate cutter selected distances from said supporting platform.

4. In a manipulator for supporting, cutting and turning cake, as claimed in claim 1, said inverting plate cutter having a handle extending radially therefrom in the plane of said inverting plate cutter, a sleeve on said pivot spindle, a bearing in said handle, said sleeve journaled in said bearing, and means for releasably securing said sleeve in said bearing at will for spacing said inverting plate cutter at selected overlying distances from said support.

5. A manipulator for supporting, cutting and turning cake comprising, a support having an upstanding cake stop flange along at least a portion of its periphery, said support having a pivot spindle spaced outwardly from said support and extending normally with respect thereto, an inverting plate cutter supported on said pivot spindle overlying and spaced from said support, and a slicing edge on said inverting plate cutter whereby when a cake is positioned on said support said inverting plate cutter may be swung about said pivot spindle to cut the cake and then invert the cake portion between said support and said inverting plate cutter.

6. In a manipulator for supporting, cutting and turning cake, as claimed in claim 5, means operatively coupled with said cake stop flange for selectively varying the height of said cake stop flange, and guide means for spacing said inverting plate cutter selected distances from said support.

7. Manipulator for slicing a layer of cake baked double thick to provide two cake layers in the making of a pastry layer cake and for turning and positioning the layers comprising, a pedestal, a platform fixedly mounted thereon, an arm mounted beneath said platform extending radially beyond the periphery of said platform, a spindle mounted on said arm normal thereto adjacent the periphery of said platform, an inverting plate having a handle, a bearing in said handle to journal said inverting plate on said spindle for swinging horizontal movement in a plane parallel wtih said platform and sliding vertical movement on said spindle, a slicing edge on said inverting plate, adjustable spacer means on said spindle for selectively spacing said inverting plate away from said platform, an outstanding cake stop mounted on the periphery of said platform within the space between the planes of said inverting plate and said platform and means for adjusting the height of said cake stop below the horizontal plane in which said inverting plate may be moved.

References Cited in the file of this patent

UNITED STATES PATENTS

| | | |
|---|---|---|
| 1,196,526 | Danner | Aug. 29, 1916 |
| 1,622,515 | Isaacs | Mar. 29, 1927 |
| 1,713,585 | Wolf | May 21, 1929 |
| 2,031,183 | Sonnenburg | Feb. 18, 1936 |
| 2,187,511 | Baxter | Jan. 16, 1940 |
| 2,696,177 | Anello et al. | Dec. 7, 1954 |

FOREIGN PATENTS

| | | |
|---|---|---|
| 67,952 | Denmark | Nov. 1, 1948 |